United States Patent [19]

Ikeo et al.

[11] 3,997,350

[45] Dec. 14, 1976

[54] HOLOGRAPHIC STORAGE MATERIAL

[75] Inventors: Hirofumi Ikeo; Shoichi Noda; Takao Sawada; Eichi Okamoto; Katsutoshi Muto, all of Amagasaki, Japan

[73] Assignee: Mitsubishi Denki Kabushiki Kaisha, Tokyo, Japan

[22] Filed: Mar. 27, 1974

[21] Appl. No.: 455,353

[30] Foreign Application Priority Data

Mar. 27, 1973 Japan .............................. 48-35223
Mar. 27, 1973 Japan .............................. 48-35225

[52] U.S. Cl. .................................. 96/88; 96/27 H; 96/90 PC; 252/300; 350/3.5
[51] Int. Cl.² .......................................... G02B 5/32
[58] Field of Search ............. 252/301.1 R, 301.1 L, 252/62.9, 300; 350/3.5; 423/593; 96/88, 27 H

[56] References Cited

UNITED STATES PATENTS 3,799,642  3/1974  Phillips et al. ..................... 96/27 H

OTHER PUBLICATIONS

Blasse, G., "Fluorescence of Uranium-Activated Compounds with Rocksalt Lattice, " J. Electrochem. Soc., 115; 738-742 (July 1968).
Phillips, W., et al., "Optical & Holographic Storage Properties of Transition Metal Doped Lithium Niobate," RCA Rev. 1972, 33(1), 94-109.
Ishada, et al. "Rh Doped LiNbO₃ as an Improved New Material for Reversible Holographic Storage," Appl. Phys. Lett., 21(5) pp. 192-193.

*Primary Examiner*—Benjamin R. Padgett
*Assistant Examiner*—Deborah L. Kyle
*Attorney, Agent, or Firm*—Wenderoth, Lind & Ponack

[57] ABSTRACT

Holographic storage materials are disclosed including lithium niobate in the form of a single crystal added with either from 0.001 to 3.0 molar percent of iridium or from 0.01 to 1.0 molar percent of uranium for the three dimensional holography.

2 Claims, 4 Drawing Figures

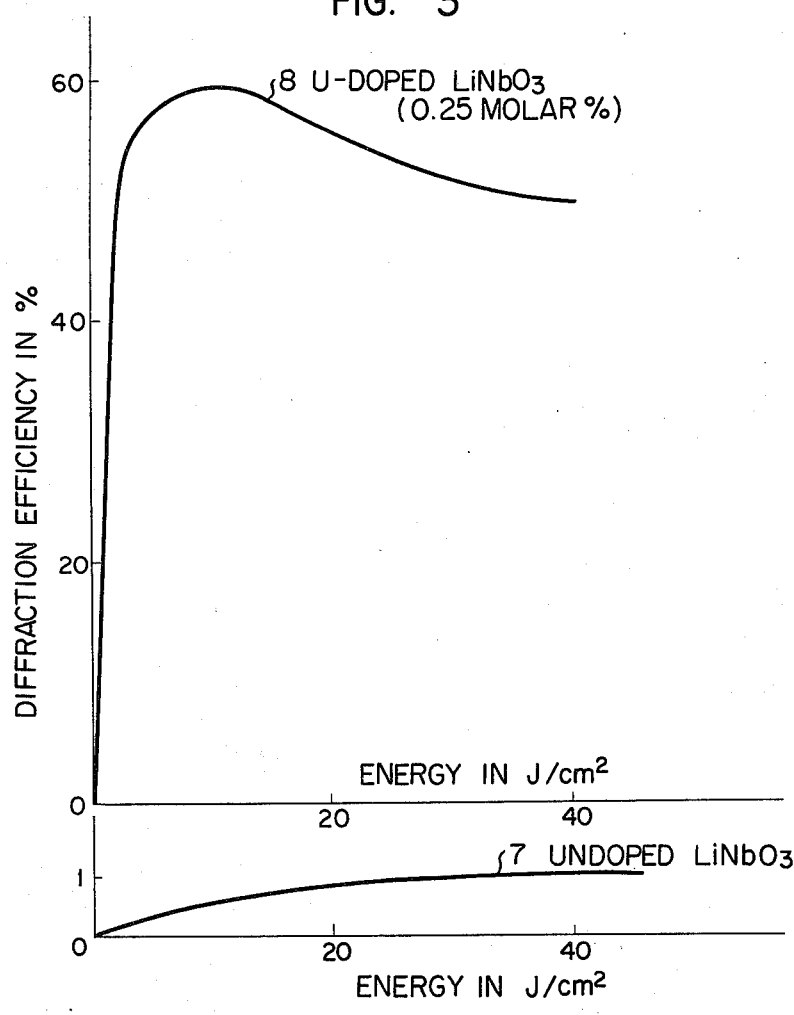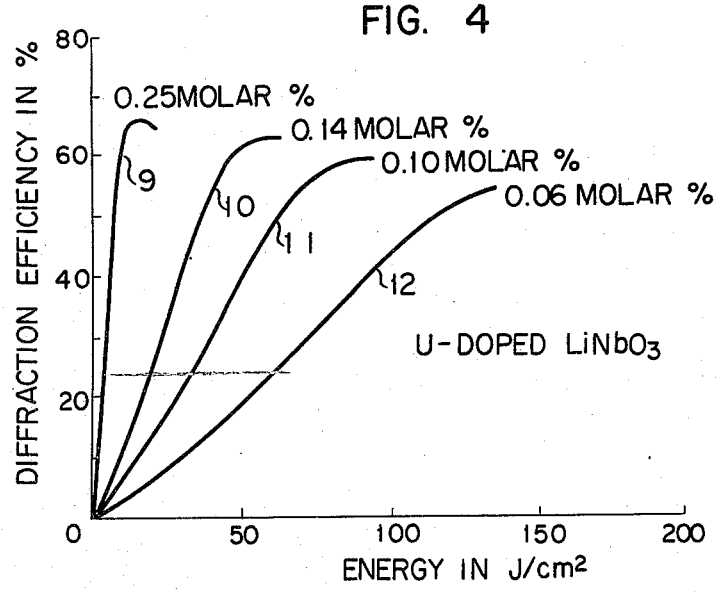

HOLOGRAPHIC STORAGE MATERIAL

BACKGROUND OF THE INVENTION

This invention relates to improvements in holographic storage materials and more particularly in lithium niobate in the form of a single crystal that is one of the holographic storage materials.

It is well known that, by splitting a beam of laser light into an object beam of light and a reference beam of light and superposing wave surfaces for both beams of light, the interference of light occurs in all that space in which the object and reference beams of light exist at the same time. If a body of photosensitive material or holographic storage material having a thickness exceeding a certain magnitude is placed in such a space then an interference pattern developed in that portion of the space in which the body of holographic storage material is placed is recorded on the body of holographic storage material as it stands. The interference pattern recorded on the holographic storage body is called a three dimensional hologram. Three dimensional holograms are one type of three dimensional diffraction gratings and are operative to diffract a beam of light incident thereupon strictly following the Bragg's condition of diffraction. Therefore it is possible to record on a single body of holographic storage material a plurality of holographs formed of beams of light having different wavelengths as well as independently reproducing the indivdual holograms from the holographic storage body. This is true in the case of a change in the orientation of the holographic body relative to the associated interference pattern of laser light. Accordingly three dimensional holograms are recently in the limetight as new recording means for use with computers and a future development thereof can be expected because they are latently high in storage capability.

One of materials recently watched as the three dimentional holographic storage materials is monocrystalline lithium niobate ($LiNbO_3$). The single crystal of that material records an interference pattern of laser light thereon as an optical damage, that is, a local change in an index of refraction thereof and is advantageous in that it has both a high storage capability and a high efficiency of diffraction while the re-recording is possible. Further it is less sensitive to temperatures in the range of room temperature, and chemically stable. In view of the standpoint of the wavelength, output and stability of laser light and also in view of the standpoint of the physical properties of the monocrystalline lithium niobate a beam of laser light caused from argon and having a wavelength of 4880A is presently used as a source of laser light for recording. For the present that beam of laser light from argon is disadvantageous in that it is low in a light energy required to provide a diffraction efficiency of 20%. Such a light energy is called hereinafter a sensitivity of recording. The figure of 20% just specified for the diffraction efficiency results from the fact that holographic storage materials having the diffraction coefficient in the order of such a figure can be put to practical use.

It is accordingly an object of the present invention to provide an improved holographic storage material for use in three dimensional holograms high in both recording sensitivity and efficiency of saturation diffraction by adding lithium niobate in the form of a single crystal with either iridium or uranium.

SUMMARY OF THE INVENTION

The present invention provides a holographic storage material consisting essentially of a single crystal of lithium niobate ($LiNbO_3$) and an element selected from the group consisting of from 0.001 to 3.0 molar percent of iridium and from 0.01 to 1.0 molar percent of uranium.

The iridium may have preferably a content ranging from 0.1 to 0.05 molar percent and the optimum content thereof may be of 0.05 molar percent.

On the other hand, the uranium may have preferably a content ranging from 0.1 to 0.3 molar percent and the optimum content thereof may be of 0.25 molar percent.

BRIEF DESCRIPTION OF THE DRAWINGS

The present invention will become more readily apparent from the following detailed description taken in conjunction with the accompanying drawings in which:

FIG. 3 is a graph similar to FIG. 1 but illustrating a single crystal of lithium niobate doped with uranium; and FIG. 4 is a graph similar to FIG. 2 but illustrating single crystals of lithium niobate differently doped with uranium.

DESCRIPTION OF THE PREFERRED EMBODIMENTS

In practicing the present invention, the Czochralski method well known in the art can be utilized to gradually withdraw a single crystal of lithium niobate ($LiNbO_3$) including or doped with iridium (Ir) from a melt within a platinum crucible including molten lithium niobate having added thereto a suitable amount of iridium. The iridium may be added in the form of iridium oxide ($IrO2_2$), iridium nitrate ($Ir(NO_3)_4$, iridium chloride ($IreI_4.H_2O$) or the like to the lithium niobate within the crucible.

Figure 1:
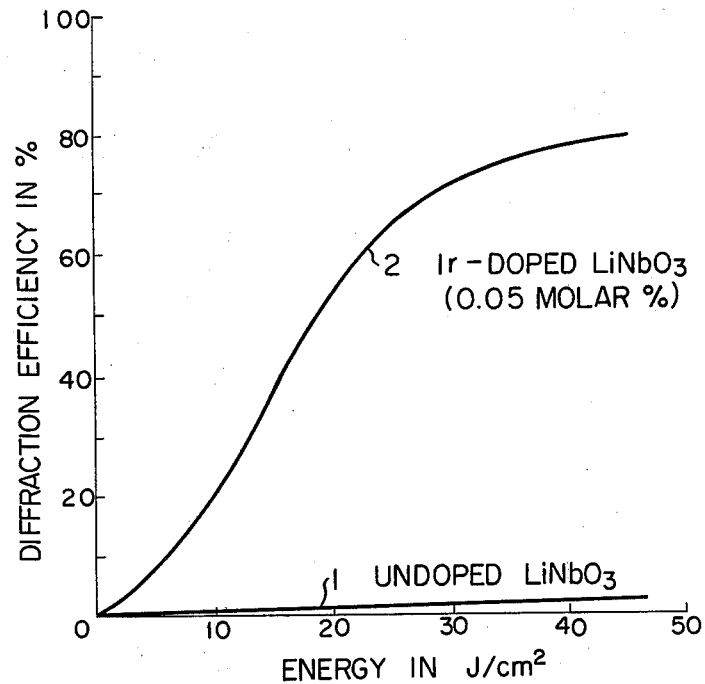
FIG. 1 is a graph illustrating a diffraction efficiency plotted against a recording energy required for an argon laser to be used to effect the recording on a single crystal of lithium niobate doped with or without some amount of iridium.

Experiments were conducted wth single crystals of lithium niobate produced as above described. An argon laser producing an output of approximately 0.2 watt per square centimeter was used to record holograms on such single crystals of lithium niobate while at the same time the same laser was used to read diffraction efficiencies from the holograms on the single crystals. The results of the experiment are shown in FIG. 1 wherein the diffraction efficiency in percent ordinate is plotted against the recording energy of light in joules per square centimeter (abscissa). Curve 1 depicts a single crystal of lithium niobate including no iridium, that is, not doped with the latter while curve 2 describes a single crystal of lithium niobate including or doped with 0.5 molar percent of the iridium.

From FIG. 1 it is seen that the addition of iridium causes the resulting recording sensitivity to be improved while increasing the diffraction efficiency. It is noted in FIG. 1 that the single crystal of lithium niobate added with 0.5 molar percent of iridium has increased in recording sensitivity by a factor of about 100 as compared with the single crystal of lithium niobate including no iridium.

Figure 2:
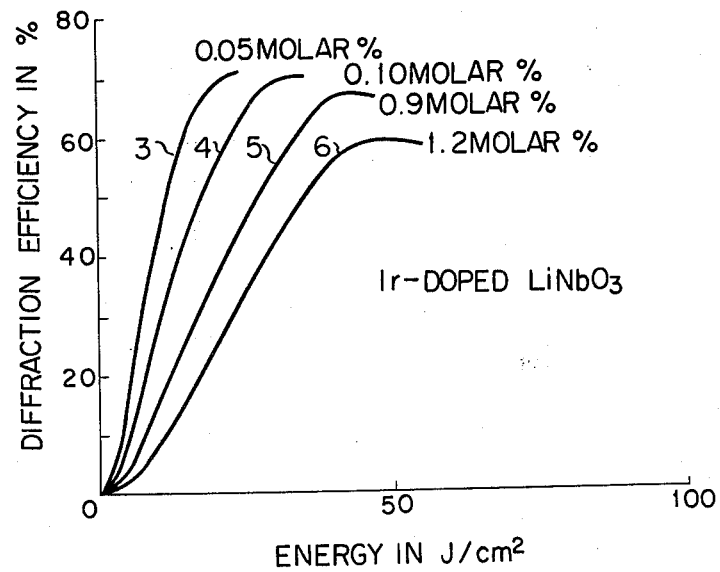
FIG. 2 is a graph similar to FIG. 1 but illustrating single crystals of lithium niobate doped with iridium in varying amounts.

FIG. 2 shows the results of experiments conducted with single crystals of lithium niobate including different amounts of iridium and produced in the same manner as above described in conjunction with FIG. 1.

In FIG. 2 curves 3, 4,5 and 6 describe the single crystals of lithium niobate doped with iridium in amounts of 0.05, 0.10, 0.9 and 1.2 molar percent respectively. Those curves shown in FIG. 2 indicate remarkable increases in recording sensitivity respectively.

In order to determine the lower limits of the content of iridium, experiments were conducted with single crystals of lithium niobate doped with 0.0001 molar percent of iridium. The results of the experiments indicated that such crystals scarcely exhibited the absorption and therefor did not outstandingly increase the recording sensitivity. However, with 0.001 molar percent of iridium added to the lithium niobate, the resulting single crystals were tinted with light yellow and decidedly increased in diffraction efficiency.

A content of iridium in the single crystal of lithium niobate depends upon a solubility of iridium with respect to a melt of lithium niobate from which the crystal has been produced. It has been experimentally found that the solubility of iridium with respect to molten lithium niobate has an upper limit and that an amount of iridium added to the single crystal of lithium niobate is restricted to a maximum value of 3.0 molar percent.

From the results of the experiments as above described on which the graphs shown in FIGS. 1 and 2 were based it has been determined that a content of iridium in lithium niobate should range from 0.001 to 3.0 molar percent and preferably from 0.01 to 0.05 molar percent. It has been found that 0.05 molar percent of iridium gives the most effectiveness.

Also single crystals of lithium niobate including uranium were produced in the same manner as above described in conjunction with the iridium except for the substitution of uranium for iridium. The single crystals thus produced were tested in the similar manner as above described in conjunction with FIGS. 1 and 2 excepting that an argon laser involved generated an output of 0.49 watt per square centimeter but at the same wavelength of 4880A.

The results of the tests are shown in FIGS. 3 and 4 similar to FIGS. 1 and 2 respectively. In FIG. 3, curve 1 describes pure lithium niobate and curve 8 describes lithium niobate doped with or including 0.25 molar percent of uranium. It is seen that the single crystal of lithium niobate including 0.25 molar percent of uranium is higher about one hundred times than that of pure lithium niobate. Curves 9, 10, 11 and 12 as shown in FIG. 4 have been plotted for single crystals of lithium niobate having added thereto uranium in amounts of 0.25, 0.14, 0.10, and 0.06 molar percent respectively and show that the recording sensitivity has remarkably increased.

With lithium niobate doped with 0.001 molar percent of uranium, the resulting single crystals scarcely exhibited the absorption and therefore could not increase in recording sensitivity. However, an increase in the content of uranium to 0.01 molar percent caused the resulting single crystals to be lightly colored and increased in diffraction efficiency.

Also as the content of uranium increases corresponding single crystals have formed therein small cavities, cracks etc. resulting in the deterioration of the quality of the crystals. Therefore the content of uranium has an upper limit. It has been found that a maximum content of uranium is of 1.0 molar percent.

From the results of the tests as above described it has been concluded that a content of uranium should range from 0.01 to 1.0 molar percent and preferably from 0.1 to 0.3 molar percent with the optimum content thereof being of 0.25 molar percent.

From the foregoing it will be appreciated the object of the present invention has been accomplished by the addition of either from 0.001 to 3.0 molar percent of iridium or from 0.01 to 1.0 molar percent of uranium to lithium niobate in the form of a single crystal.

What we claim is:

1. A holographic storage material consisting essentially of a single crystal of $LiNbO_3$ and iridium in an amount of 0.001 to 3.0 molar percent.

2. A holographic storage material according to claim 1, where iridium is present in an amount of from 0.01 to 0.05 molar percent.

* * * * *